US006850481B2

(12) United States Patent
Wu et al.

(10) Patent No.: US 6,850,481 B2
(45) Date of Patent: Feb. 1, 2005

(54) CHANNELS ESTIMATION FOR MULTIPLE INPUT—MULTIPLE OUTPUT, ORTHOGONAL FREQUENCY DIVISION MULTIPLEXING (OFDM) SYSTEM

(75) Inventors: Shiquan Wu, Nepean (CA); Wen Tong, Ottawa (CA); Jianglei Ma, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 764 days.

(21) Appl. No.: 09/751,166

(22) Filed: Dec. 29, 2000

(65) Prior Publication Data

US 2002/0122381 A1 Sep. 5, 2002

Related U.S. Application Data

(60) Provisional application No. 60/229,972, filed on Sep. 1, 2000.

(51) Int. Cl.[7] ............................................. H04J 11/00
(52) U.S. Cl. ....................................... 370/208; 370/210
(58) Field of Search ................................ 370/208, 210, 370/242, 342, 291; 375/350, 371, 232, 208, 130–136; 711/220; 455/506–65

(56) References Cited

U.S. PATENT DOCUMENTS

| 5,469,465 A | * | 11/1995 | Birchler et al. ............. 375/346 |
| 5,603,107 A | * | 2/1997 | Gottfried et al. ........... 455/133 |
| 5,973,642 A | | 10/1999 | Li et al. |
| 6,219,334 B1 | * | 4/2001 | Sato et al. .................. 370/210 |
| 6,621,851 B1 | * | 9/2003 | Agee et al. ................. 375/130 |

* cited by examiner

Primary Examiner—Chi Pham
Assistant Examiner—Prenell P Jones
(74) Attorney, Agent, or Firm—Mintz, Levin, Cohn, Ferris, Glovsky & Popeo, P.C.

(57) ABSTRACT

The distortion in the sub-carrier signals is determined by transmitting known values that are incorporated into the preamble portion of the frame and/or are incorporated into pilot symbols that are inserted into the data portion of the frame. The receiver typically receives these known values in a distorted form and then processes the distorted values together with the original known values to obtain a channel response. The channel response is then used to estimate the frequencies at which the channels are received.

59 Claims, 7 Drawing Sheets

CHANNELS ESTIMATION FOR MULTIPLE INPUT— MULTIPLE OUTPUT, ORTHOGONAL FREQUENCY DIVISION MULTIPLEXING (OFDM) SYSTEM

RELATED APPLICATIONS

This application claims the priority of U.S. Provisional Application No. 60/229,972, filed Sep. 1, 2000.

BACKGROUND OF THE INVENTION

The present invention is directed to the delivery of data via a wireless connection and, more particularly, to the accurate delivery of data at high rates via a wireless connection.

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

A known approach for efficiently delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation), in which only one signal at a time is sent using only one radio frequency, or frequency division multiplexing (FDM), in which portions of the channel bandwidth are not used so that the sub-carrier frequencies are separated and isolated to avoid inter-carrier interference (ICI).

Further, each block of data is converted into parallel form and mapped into each subcarrier as frequency domain symbols. To get time domain signals for transmission, an inverse discrete Fourier transform or its fast version, IFFT, is applied to the symbols. The symbol duration is much longer than the length of the channel impulse response so that inter-symbol interference is avoided by inserting a cyclic prefix for each OFDM symbol. Thus, OFDM is much less susceptible to data loss caused by multipath fading than other known techniques for data transmission. Also, the coding of data onto the OFDM sub-carriers takes advantage of frequency diversity to mitigate loss from frequency-selective fading if FEC is applied.

In addition to having greater spectral efficiency i.e., more bps/Hz, than conventional transmission schemes, the OFDM spectral efficiency is further enhanced because the spectrum can be made to look like a rectangular window so that all frequencies are similarly utilized. Moreover, OFDM is less sensitive to timing errors because the timing errors are translated to a phase offset in the frequency domain.

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

Presently, MIMO systems either are designed to transmit signals having spatial diversity or are designed to transmit signals having temporal diversity. It is therefore desirable to provide a common system that can deliver signals with either spatial diversity or temporal diversity depending on the transmission environment.

It is further desirable to provide a system that has the advantages of both an OFDM system as well as those of a MIMO system. Such a system would transmit the OFDM symbols over a plurality of channels with either spatial diversity or temporal diversity between the symbols. However, when the signals are received at the remote station, the signals may be distorted because of transmitter imperfections as well as because of environmental effects which change the frequencies of the channels and may increase the bit error rate (BER).

It is therefore desirable to provide a system in which the receiver is able to compensate for the distortions in the signal in an efficient manner.

SUMMARY OF THE INVENTION

The present invention estimates the distortion in the sub-carrier signals by transmitting known values that are incorporated into the preamble portion of the frame and/or are incorporated into pilot symbols that are inserted into the data portion of the frame. The receiver typically receives these known values in a distorted form and then processes the distorted values together with the original known values to obtain the channel response. The channel response is then used to compensate for the distortions.

In accordance with an aspect of the invention, distortion in the sub-carrier channels of signals received by a respective receiver from a plurality of transmitters is estimated. Each of the signals includes a portion that represented a plurality of known values when the signal was transmitted. The portion of the signal is extracted to obtain a frequency domain data vector. Each element of the frequency domain data vector is multiplied by a respective element of a known vector to obtain a channel response vector. Each element in the known vector is a function of a respective one of the plurality of known values, and each element in the channel response vector is indicative of a distortion value. Respective ones of the channel response vectors are selected to form a plurality of further channel response vectors. Each of the further channel response vectors corresponds to a respective one of the plurality of transmitters. Within each of the further channel response vectors, at least one zero value is inserted before or after each non-zero valued element therein such that the elements of the further channel response vectors correspond to a transmission pattern of its corresponding transmitter. The elements of the further channel response vectors are interpolated to obtain a plurality of distortion values each of which corresponds to a respective zero value element of the further channel response vectors. The plurality of distortion values are substituted in place of its corresponding zero value element. An inverse fast Fourier transform (IFFT) is performed on each of the further channel response vectors to obtain a plurality of time domain further channel response vectors. A zero value is substituted in place of any element of the time domain further channel response vectors that has a value indicative of signal noise. A fast Fourier transform (FFT) is performed on the time domain further channel response vectors to obtain a plurality of frequency response vectors.

According to another aspect of the invention, distortion in the sub-carrier channels of signals received by a respective receiver from a plurality of transmitters is estimated. Each of the signals includes a portion that represented a plurality of known values when the signal was transmitted. The portion of the signal is extracted to obtain a frequency domain data vector. The frequency domain data vector is multiplied by a known array to obtain a channel response vector. Each element in the known array is a function of a respective one of the plurality of known values, and each element in the channel response vector is indicative of a distortion value. The elements of the channel response vector are interpolated to obtain one or more distortion values each of which corresponds to a respective zero value element of the channel response vector. The distortion values are substituted in place of their corresponding zero value elements. An inverse fast Fourier transform (IFFT) is performed on the channel response vector to obtain a domain channel response vector. A zero value is substituted in place of any element of the time domain further channel response vectors that has a value indicative of signal noise. A fast Fourier transform (FFT) is performed on the time domain further channel response vectors to obtain a plurality of frequency response vectors.

According to a further aspect of the invention, distortion in the sub-carrier channels of signals received by a respective receiver from a plurality of transmitters is estimated. Each of the signals includes a portion that represented a plurality of known values when the signal was transmitted. The portion of the signal is sampled during at least portion of a plurality of times nT to obtain a plurality of sample values $r_i(nT)$, where i is an index of the respective receiver. Each sample value $r_i(nT)$ is related to a plurality of time domain channel response values $ch_{mi}(kT)$ according to the relation:

$$r_i(nT) = \sum_{k=-22}^{22} ch_{mi}(kT)T_{n-k} + N_i(nT),$$

where m is an index of a respective transmitter that is transmitting a non-zero value at time nT, $T_{n-k}$ is a corresponding known value, and $N_i(nT)$ is noise value for receiver i. A plurality of equations is obtained, and the equations are solved to obtain a plurality of solutions. The plurality of solutions is averaged to obtain the time domain channel response values $ch_{mi}(kT)$.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
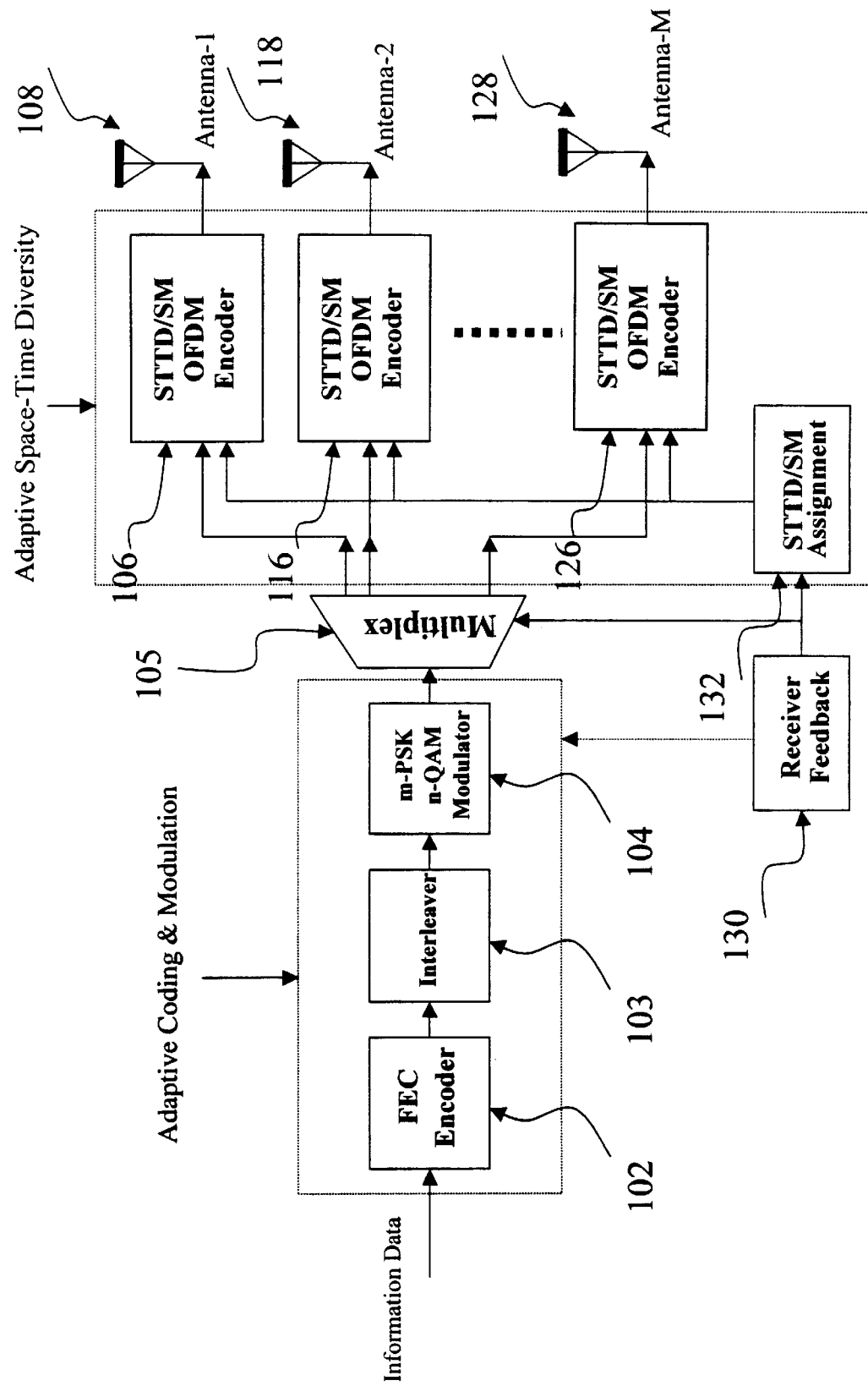
FIG. 1 is a block diagram showing a MIMO-OFDM transmitter system according to an embodiment of the invention.

FIG. 1 is a block diagram showing an OFDM-MIMO transmitter system of the invention. A stream of raw data bits is delivered to an encoder/interleaver 102 which segments the stream into segments of 1024 bits, for example.

The encoder/interleaver 102 then delivers the data segments to an adaptive quadrature amplitude modulation (QAM) encoder 104 which encodes sub-segments of the bits and maps the sub-segments of bits into predetermined corresponding complex-value points in a constellation. The complex-value points each represent discrete phase and amplitude values that form a sequence of frequency-domain sub-symbols that represent the data.

The adaptive QAM encoder 104 then sends the sequence of sub-symbols to one of space-time transmitter diversity and spatial multiplexing (STTD/SM) OFDM encoders 106, 116, 126. The encoders 106, 116, 126 assign the constellation points to respective sub-carrier channels and then deliver the sub-carriers to an inverse fast Fourier transform (IFFT) circuit which modulates the phase and amplitude of the sub-carrier channels to obtain time-domain OFDM symbols. The OFDM sub-carrier channels each have a frequency spectrum such that the frequency of the primary signal peak of the sub-carrier coincides with a minima in the spectra of neighboring sub-carrier channels so that the sub-carriers are orthogonal to each other.

A preamble symbol is also periodically inserted into the time-domain OFDM symbols and consists of one or more training symbols and one or more data symbols that are used for phase correction and channel estimation. The time-domain OFDM symbols are then transmitted by one of antennas 108, 118, 128.

The operation of the MIMO-OFDM transmitter system and the design of the data frames and preamble are described in greater detail in U.S. application Ser. Nos. 09/750,804, titled "Adaptive Time Diversity And Spatial Diversity For OFDM", and 09/751,879, titled "Preamble Design for Multiple Input-Multiple Output (MIMO) Orthogonal Frequency Division Multiplexing (OFDM) System for Wireless Applications", both filed on the same day as the present application by the inventors of the present application, and both incorporated herein by reference.

Figure 2:
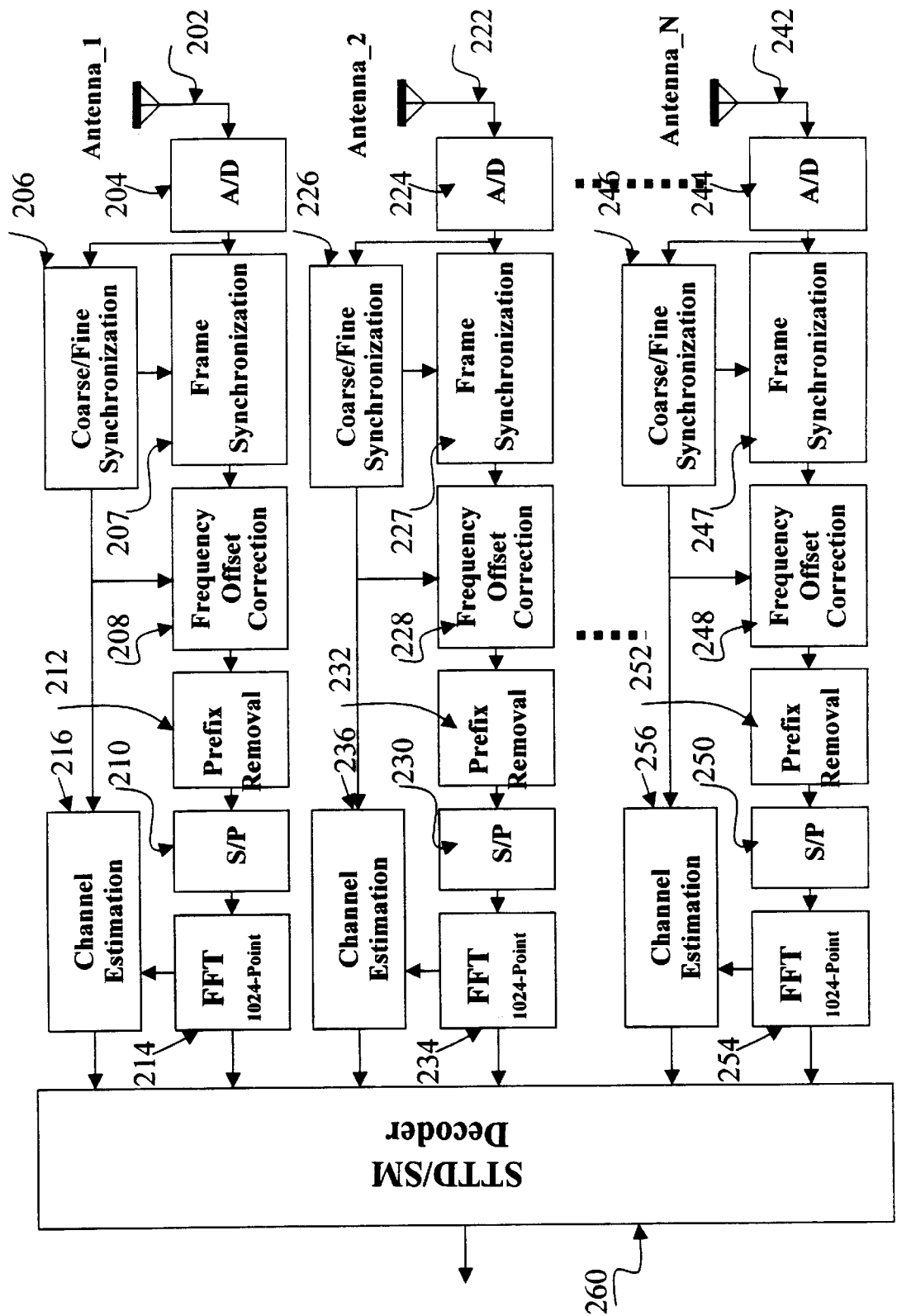
FIG. 2 is a block diagram showing a MIMO-OFDM receiver system according to an embodiment of the invention.

FIG. 2 is a block diagram showing an OFDM receiver system of the invention. RF signals received by antenna 202, 222 or 242 are delivered to its respective analog to digital (A/D) converter 204, 224, 244 which converts the analog OFDM signals into digital signals. The digital signals are delivered to a respective fast acquisition circuit 206, 226 or 246 which uses the preamble portion of the signal to synchronize the signal and determine the frame boundaries of the transmitted data. The framed data is then delivered to a serial-to-parallel converter 210, 230 or 250 which converts the data into vector form.

The synchronization operation is described in greater detail in U.S. application Ser. No. 09/751,881, titled "Synchronization in a Multiple-input/multiple-output (MIMO) Orthogonal Frequency Division Multiplexing (OFDM) System For Wireless Applications", filed on the same day as the present application by the inventors of the present application, and incorporated herein by reference.

The digital signals are delivered to a respective frequency difference ($\Delta f$) corrector 208, 228 or 248 which corrects for any differences between the oscillation frequency of the local oscillator of the transmitter system and the oscillation frequency of the local oscillator of the receiver system. The corrector delivers a correction signal to its respective serial-to-parallel converter 210, 230 or 250 that is used in generating the data vectors.

The serial-to-parallel converter 210, 230 or 250 then delivers the data vectors to its respective cyclic remover 212, 232 or 252 which removes unneeded cyclical extensions in the data vector and delivers the truncated data vectors to its respective Fast Fourier Transform (FFT) circuit 214, 234 or 254. The FFT circuit 214, 234 or 254 demodulates the data vectors to recover the original sequences of frequency domain sub-symbols and then delivers the frequency domain sub-symbols to a STDM/SM OFDM decoder 260 which converts the sub-symbols into the original raw data bit stream.

The operation of the MIMO-OFDM receiver system is described in greater detail in U.S. application Ser. Nos. 09/750,804 and 09/751,879.

The OFDM data signals are transmitted by the OFDM-MIMO transmitter system at predetermined sub-carrier channel frequencies. However, the received signals are often distorted versions of transmitted ones because of transmitter imperfections as well as because of environmental effects that change the amplitude and the phase of the signals and which, if not corrected, increase the bit error rate of the receiver.

Thus, the OFDM-MIMO receiver system shown in FIG. 2 includes channel estimators 216, 236, 256 that provide correction values for the signal distortion. The channel estimator 216, 236, 256 receives the framed data from its respective fast acquisition circuit 206, 226 or 246 and receives the frequency domain sub-symbols from its corresponding FFT circuit 214, 234 or 254. Using known frequency domain sub-symbols, the channel estimator 216, 236, 256 each estimate the values of channel response vectors that are delivered to the STDM/SM OFDM decoder 260 to compensate for the distortions in the received signal.

The estimation of the frequency domain channel response vectors is now described in greater detail with reference to an example shown in FIG. 3.

Figure 3:
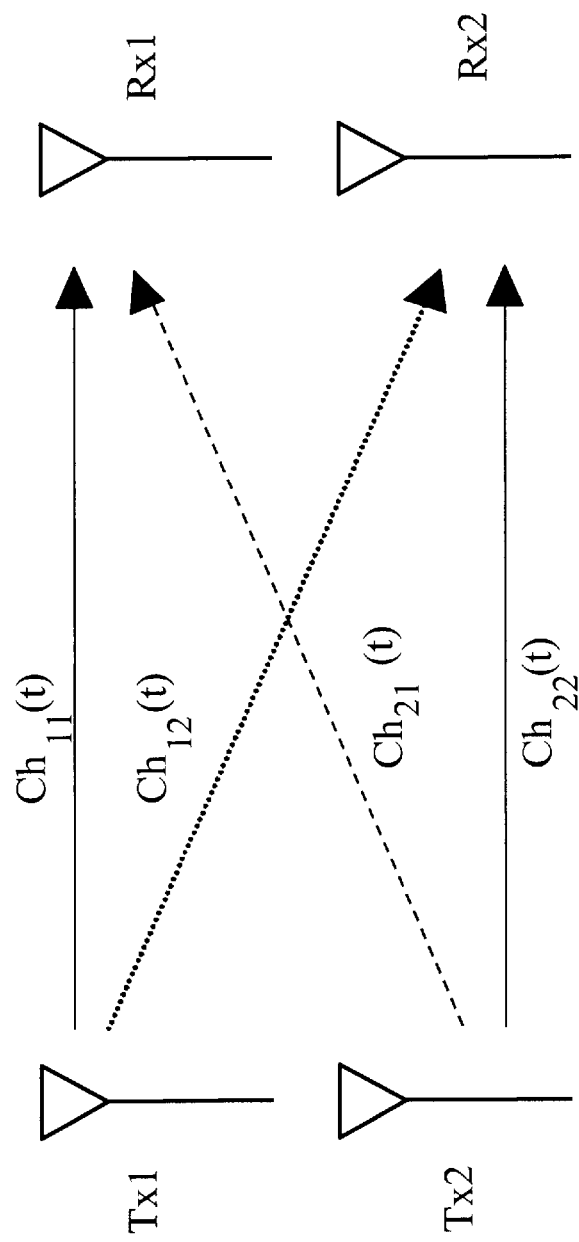
FIG. 3 is a diagram showing an example of a MIMO-OFDM arrangement in which two transmitters each broadcast signals over respective MIMO-OFDM sub-carrier channels to two receivers according to the invention.

FIG. 3 shows an OFDM-MIMO configuration in which the base station transmits using two transmitting antennas and the remote station receives using two receiving antennas, known as a 2×2 configuration. Each transmitting antenna transmits via two of the available physical channels such that transmitter Tx1 transmits over channel $Ch_{11}(t)$ to receiver Rx1 and transmits over channel $Ch_{12}(t)$ to receiver Rx2. Similarly, transmitter Tx2 transmits over channel $Ch_{21}(t)$ to receiver Rx1 and transmits over channel $Ch_{22}(t)$ to for receiver Rx2. Therefore, each receiver receives a combination of all the transmitted signals.

The OFDM-MIMO signals are transmitted in a manner that depends on whether the preamble portion or data portion of a frame is being sent. When the preamble portion is transmitted, the preamble may be transmitted as frequency domain coded symbols or as time domain coded symbols.

Figure 4:
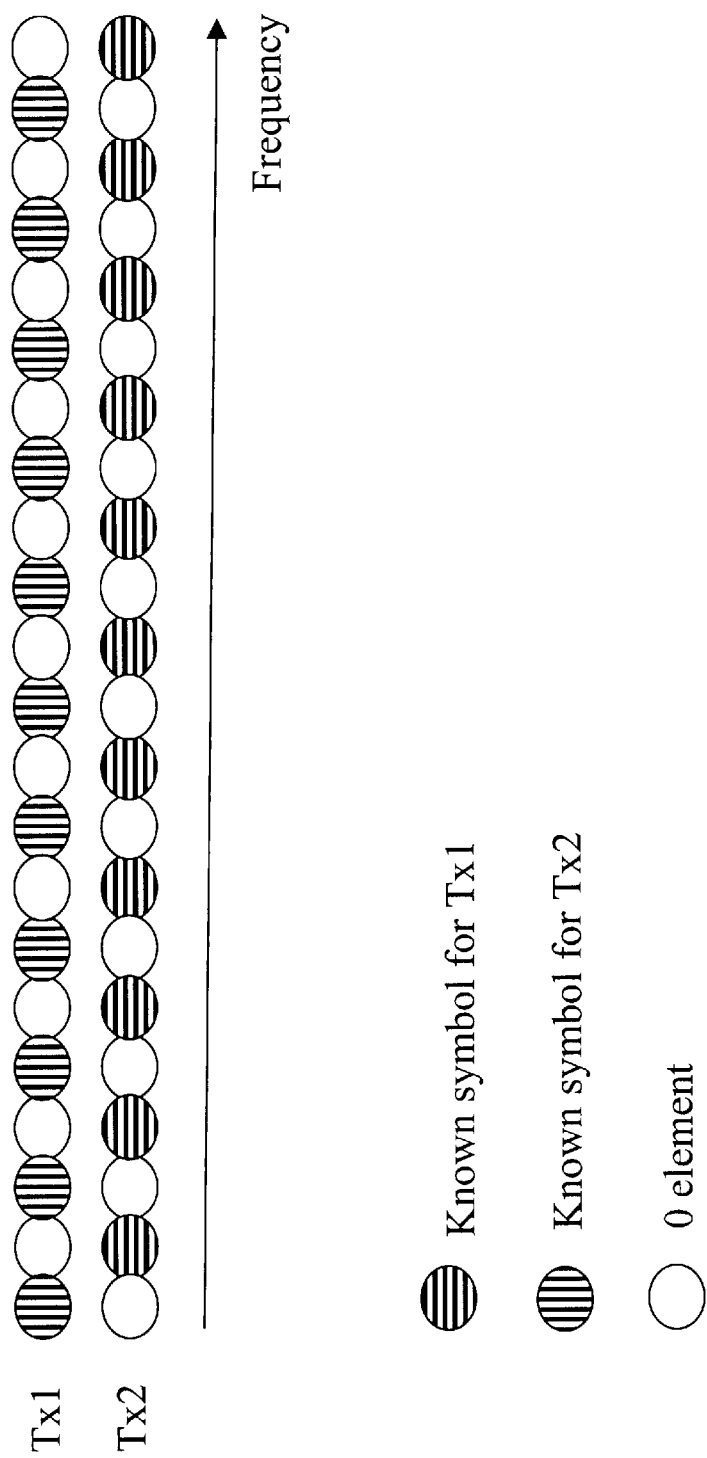
FIG. 4 is a diagram showing portions of a frequency domain MIMO-OFDM a preamble respectively broadcast by two transmitters according to the invention.

In the frequency domain, each transmitter delivers non-zero valued symbols at respective frequency sub-channels. FIG. 4 illustrates an example in which two transmitters, Tx1 and Tx2, transmit in the frequency domain. At the frequencies where transmitter Tx1 sends known non-zero values, transmitter Tx2 send zero elements or does not transmit. Similarly, at the frequencies where transmitter Tx2 sends known non-zero values, transmitter Tx1 sends zero valued symbols or does not transmit.

Figure 5:
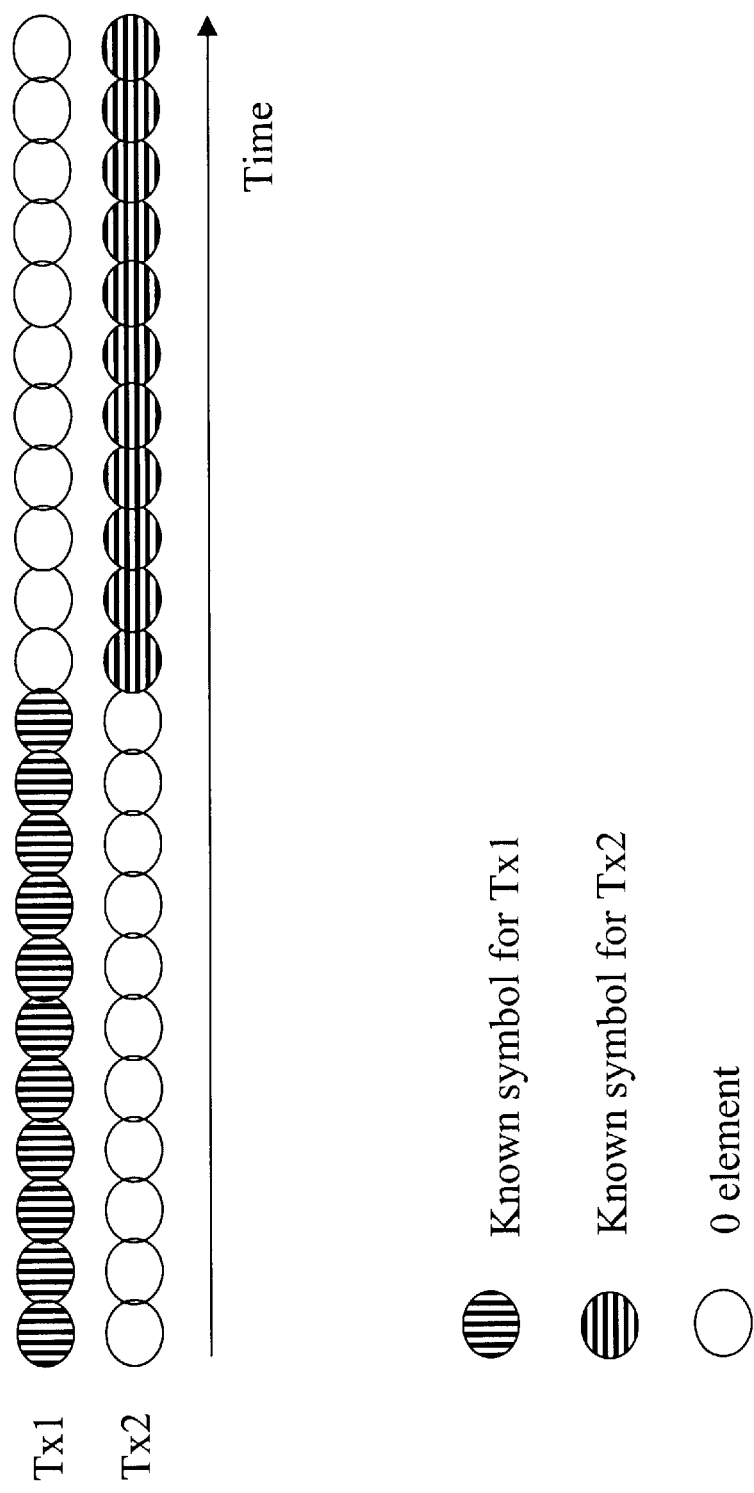
FIG. 5 is a diagram showing portions of a time domain MIMO-OFDM preamble respective broadcast by two transmitters according to the invention.

In the time domain, each transmitter transmits non-zero values at respective times, FIG. 5 shows an example in which the transmitter Tx2 transmits zero values or does not transmit during intervals that the transmitter Tx1 transmits non-zero valued, known symbols. Similarly, when the transmitter Tx2 transmits non-zero valued, known symbols, the transmitter Tx1 transmits zero values or does not transmit.

Figure 6:
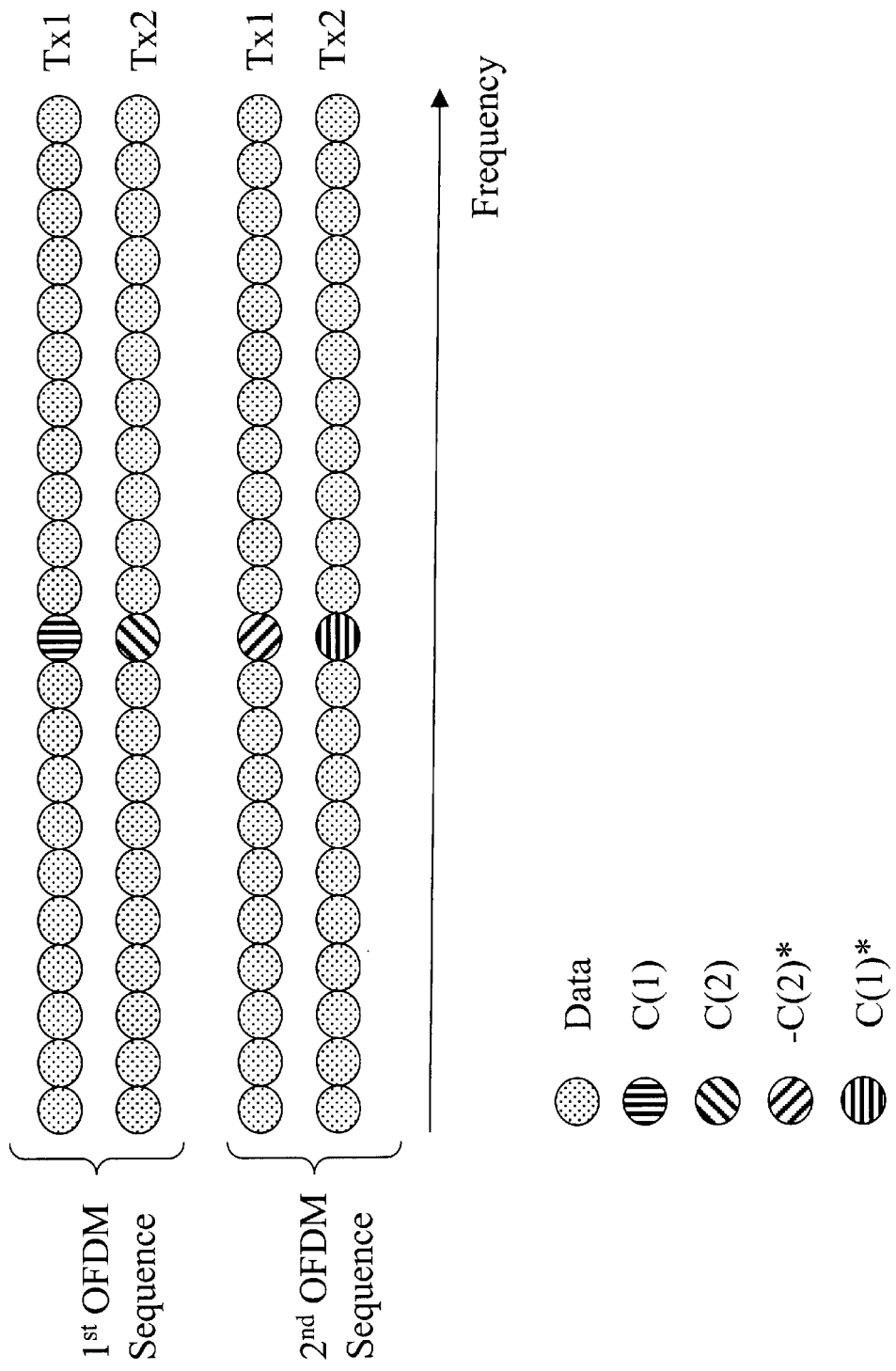
FIG. 6 is a diagram showing an example of the insertion of pilot symbols within MIMO-OFDM signals respectively broadcast by two transmitters according to the invention.
Figure 7:
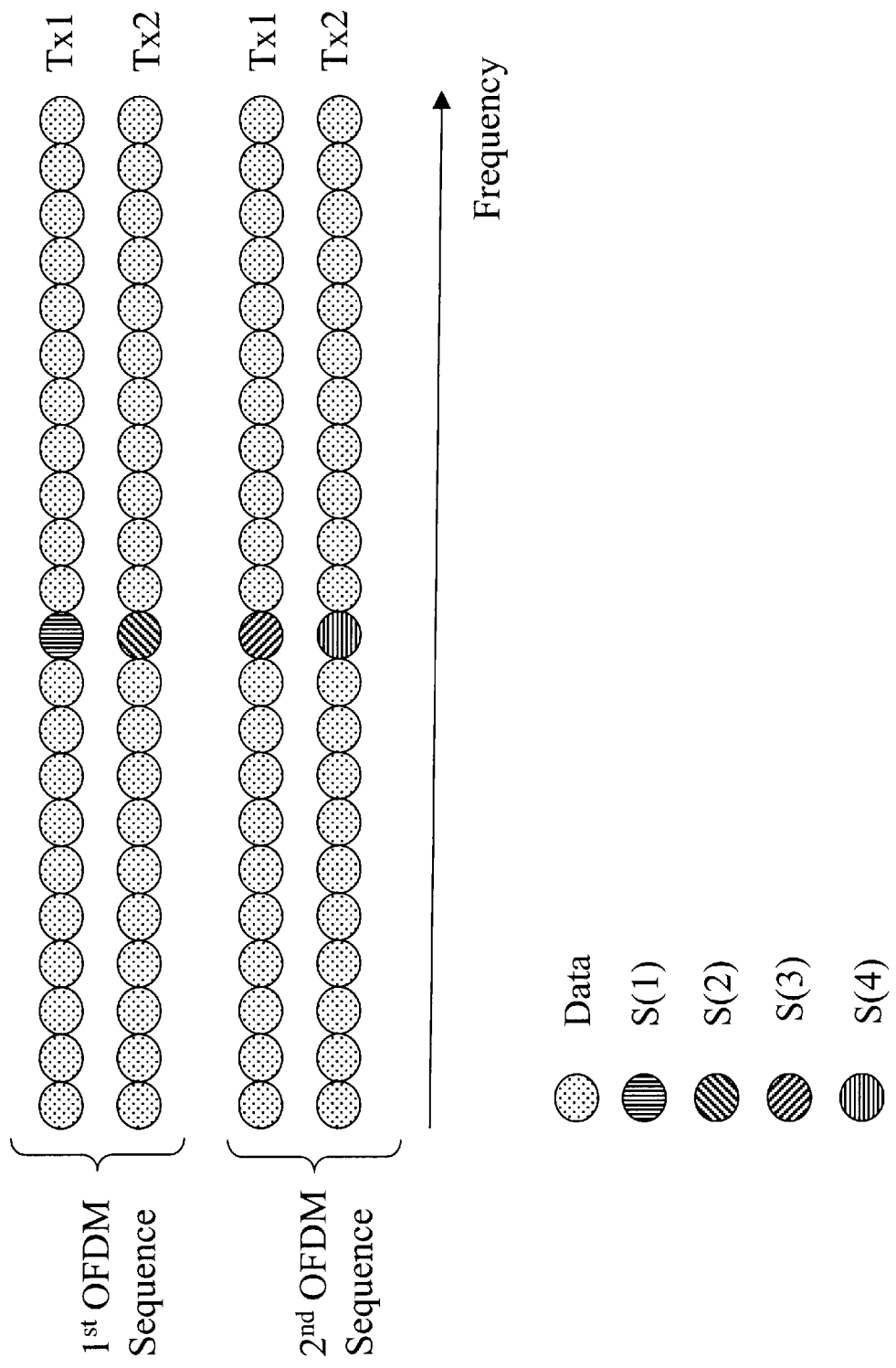
FIG. 7 is a diagram showing an example of the insertion of pilot symbols within MIMO-OFDM signals respectively broadcast by two transmitters according to the invention.

When the data portion of the signal is transmitted, each transmitter transmits frequency domain coded symbols in which a respective portion of the frequency sub-channels is allocated for the transmission of known pilot symbols values and the remainder is allocated for data values. The pilot symbols values may be transmitted using spatial diversity or using time diversity. FIG. 6 shows an example of spatial diversity transmission in which transmitter Tx1 sends pilot symbol C(1) and transmitter Tx2 sends pilot symbol C(2) during a first OFDM symbol sequence and in which transmitter Tx1 sends pilot symbol −C(2)* and transmitter Tx2 sends pilot symbol C(1)* during a second OFDM symbol sequence. FIG. 7 illustrates an example of time diversity transmission in which transmitter Tx1 sends pilot symbol S(1) and transmitter Tx2 sends pilot symbol S(2) during a first OFDM symbol sequence and in which transmitter Tx1 sends pilot symbol S(3) and transmitter Tx2 sends pilot symbol S(4) during a second OFDM symbol sequence. The determination of whether to transmit using time diversity or using spatial diversity and the implementation of time diversity and spatial diversity transmission are described in greater detail in U.S. application Ser. No. 09/750,804.

The signals sent by each transmitter include values that are known to the receiver and which may be used by the receiver to determine the degree of distortion in the signals that are actually received by the receiver. As described above, the known values are sent as part of the preamble portion or as pilot values that are inserted into the data portion. As an example, each transmitter is assigned a unique pseudo-noise (PN) sequence that is associated with a prime number. The elements of the PN sequence is defined by the relation:

$$C_l(i) = (-1)^{li} \exp(j\pi l^2 i / 1024),$$

where i is the index of a respective element in the sequence and has a value i=1, . . . , N, l is an integer value that is uniquely assigned to a transmitter, j=sqrt(−1) and N is an integer which equals 1024, for example. Preferably, l is also a prime number that is selected from the values l=3, 5, 7, 11, 13, 17, . . . to increase the auto-correlation and cross-correlation during subsequent processing.

When the PN sequences or other known values are sent as part of the frequency domain preamble, the channels at which the data is received may be estimated by determining channel response vectors in the frequency domain.

After a received MIMO-OFDM signal is synchronized, a data vector is generated that is comprised of the corresponding time domain preamble data that is received by the receiver. As an example, a data vector $y1=(y1(0), y1(1), \ldots, y1(1023))$ is comprised of preamble data sampled in the time domain by a receiver Rx1. The data vector is extracted from the preamble sent by each of the transmitters.

Then, a fast Fourier transform (FFT) is performed on the data vector y1 to obtain a frequency domain data vector z1. Each element $z_1(k)$ of the frequency domain data vector z1 is then multiplied, sample-by-sample, by the known transmitted pseudo-noise sequence to obtain a channel response vector:

$$Hf_l = (Hf_l(0), Hf_l(1), \ldots, Hf_l(1023)),$$

where l is a prime number assigned to a respective transmitter base station, $Hf_l(k) = z(k)C_l(k)^*$, and $\{C_l(k)\}$ is the PN sequence corresponding to the transmitter base station that is assigned the prime number l.

Then, the vector $Hf_l$ is decimated every M elements, and zeros are inserted before and/or after each decimated element according to transmitter pattern to obtain M channel response vectors which are defined as:

$$H1f, H2f, \ldots, Hmf,$$

where $H1f = (Hf_1(0), 0, \ldots, 0, Hf(M), 0 \ldots 0, Hf(2M), \ldots)$, and $Hmf = (0, \ldots, 0, Hf(m), 0, \ldots, 0, Hf(M+m), 0, \ldots, 0, Hf(2M+m), \ldots)$ for $m = 2, 3, \ldots, M$.

The channel response vectors H1f, H2f, ..., Hmf, ..., HMf respectively represent the partial frequency domain information of each of the channels, namely the partial frequency domain information transmitted from transmitter 1 to receiver 1, the partial frequency domain information transmitted from transmitter 2 to receiver 1, the partial frequency domain information transmitted from transmitter 3 to receiver 1, etc, up until the partial frequency domain information transmitted from transmitter M to receiver 1.

The non-zero elements of the channel response vectors are interpolated to obtain distortion values for each of the zero value elements of the channel response vectors. The interpolation is carried out using a known method, such using linear interpolation or using a quadratic spline. The interpolated values are then substituted in place of the zero value elements in the further channel response vectors.

Thereafter, an inverse fast Fourier transform (IFFT) is performed on each of the further channel response vectors to obtain a plurality of time domain further channel response vectors, and then a zero value is substituted in place of any element of the time domain further channel response vectors whose indices are larger than the supposed maximum delay spread and are thus indicative of signal noise.

The "de-noising" of the time domain further channel response vectors improves the accuracy of the channel estimation. Because only one OFDM symbol is used for training, the estimated channels are otherwise very noisy. The de-noising operation removes most of the noise contained in the estimated channels and provides accurate multiple channel estimations.

The same process may also be performed for the other receivers. Then, an FFT is performed on the time domain further channel response vectors to obtain clean frequency domain channel response vectors H1i, H2i, ..., Hmi, for each receiver i, which are then used to recover the transmitted information.

Alternatively, pseudo-noise sequences or other known values are transmitted as pilot symbols that are inserted at various locations within the STTD structure and are used to estimate the frequency domain channel response of the designated sub-carrier. FIG. 6 illustrates an example in which pilot symbols are inserted into a sub-carrier signal k of each OFDM symbol sequence sent by transmitters Tx1 and Tx2. As part of a first OFDM symbol sequence, the transmitter Tx1 sends symbol C(1) and the transmitter Tx2 sends symbol C(2) via the same sub-carrier k. Then, as part of a second OFDM symbol sequence, the transmitter Tx1 sends symbol $-C(2)^*$, namely the negative of the complex conjugate of the symbol sent by transmitter Tx2 in the first OFDM symbol sequence, and the transmitter Tx2 sends symbol $C(1)^*$, namely the complex conjugate of the symbol sent by transmitter Tx1 in the first OFDM symbol sequence, via a sub-carrier k.

When the MIMO-OFDM signal is detected and digitized by a receiver, the signal is synchronized, and a data vector is generated that is comprised of time domain sampled data as described above. A fast Fourier transform (FFT) is then carried out on the sampled data to obtain a frequency domain data vector Z. Then, to obtain a channel response vector, the frequency domain channel responses are estimated by multiplying the frequency domain data vector by an array comprised of the originally transmitted values.

As an example, when two transmitters send data to two receivers, as shown in FIG. 6, the frequency domain data vector Z for receiver Rx1 is $Z=(y_1(1,k), y_2(1,k))$, and the frequency domain channel response sub-carrier k is defined by the relation:

$$\begin{bmatrix} H_{11}(k) \\ H_{21}(k) \end{bmatrix} = \frac{1}{|C(1)|^2 + |C(2)|^2} \begin{bmatrix} C(1) & C(2) \\ -C(2)^* & C(1)^* \end{bmatrix}^* \begin{bmatrix} y_1(1,k) \\ y_1(2,k)^* \end{bmatrix}.$$

The frequency domain data vector Z for receiver Rx2 is $Z=(y_1(2,k), y_2(2,k))$, and the frequency domain channel response for the sub-carrier k is defined by the relation:

$$\begin{bmatrix} H_{12}(k) \\ H_{22}(k) \end{bmatrix} = \frac{1}{|C(1)|^2 + |C(2)|^2} \begin{bmatrix} C(1) & C(2) \\ -C(2)^* & C(1)^* \end{bmatrix}^* \begin{bmatrix} y_2(1,k) \\ y_2(2,k)^* \end{bmatrix}.$$

Though only two pilot samples are shown, additional pilot samples may be included at other sub-carriers or in sub-carriers of the subsequent OFDM symbols. Further, the frequency domain channel response may be determined for an arrangement having two or more transmitters and two or more receivers according to the relation:

$$\begin{bmatrix} H_{1i}(k) \\ H_{2i}(k) \\ \vdots \end{bmatrix} = \frac{1}{|C(1)|^2 + |C(2)|^2 + \ldots} \begin{bmatrix} C(1) & C(2) & \ldots \\ -C(2)^* & C(1)^* & \ldots \\ \vdots & \vdots & \ddots \end{bmatrix}^* \begin{bmatrix} y_i(1,k) \\ y_i(2,k)^* \\ \vdots \end{bmatrix},$$

wherein i is an index of the respective receiver, k is a respective sub-carrier channel, $H_{ji}(k)$ is an element in the channel response vector indication a channel response for a signal transmitted by transmitter Tx1 to receiver i over sub-carrier channel k, $H_{2i}(k)$ is an element in the channel response vector indication a channel response for a signal transmitted by transmitter Tx2 to receiver i via sub-carrier channel k, etc., C(1) is a pilot value transmitted by transmitter Tx1, C(2) is a pilot value transmitted by transmitter Tx2, etc., $y_i(1,k)$ is an element of the frequency domain data vector representing a value received by receiver i from transmitter Tx1 via sub-carrier channel k, and $y_2(1,k)$ is an element of the frequency domain data vector representing a value received by receiver i from transmitter Tx2 via sub-carrier channel k, etc.

Then, the elements of the channel response vector are interpolated, an inverse fast Fourier transform (IFFT) is performed on each channel response vector, zero values are substituted in place of any element whose indices are larger than the supposed maximum delay spread, and an FFT is performed to obtain the frequency channel response vectors H1i, H2i, ..., Hmi, for each receiver i, in the manner described above.

The frequency channel response vectors may be estimated solely by using the pilot symbols or by using the preamble values, or the frequency channel response vectors may be estimated according to both methods and the sub-carrier channel frequencies estimated using the frequency channel response vectors derived from both methods.

As a further alternative, the pseudo-noise sequences or other known values are sent in the time domain and are to included as part of the preamble for estimating the frequency channel response vectors. The estimation, however, is first carried out in the time domain, rather than being performed in the frequency domain, as previously described, and the estimated values are then converted to the frequency domain. The time domain preambles are designed to be orthogonal among the respective transmitters. As an example, for a two transmitter-two receiver (2×2) configuration, the following preamble patterns are transmitted: (1) Transmitter Tx1 transmits known values $\{T_0, T_1, \ldots, T_{511}, 0, 0, \ldots, 0\}$, namely transmitter Tx1 transmits a non-zero PN sequence during the first half of the OFDM symbol time interval $[0, T_{ofdm}/2]$ and transmits zeros or is switched off during the second half of OFDM symbol time interval $T_{ofdm}/2, T_{ofdm}]$. (2) Concurrently the transmitter Tx2 transmits all zeros or is switched off in the first half of the OFDM symbol time interval $[0, T_{ofdm}/2]$ and transmits known values $\{T_{512}, T_{513}, \ldots, T_{1023}\}$ during the second half of OFDM symbol time interval $[T_{ofdm}/2, T_{ofdm}]$. In this way each receiver receives values from only one transmitter at a time. FIG. 5 shows an example of known symbols that are transmitted in this manner.

The invention can be applied to multiple transmitters with multiple base stations in a similar fashion. The cyclic extension part, which is usually a known OFDM system, is omitted here. The time domain preamble can be regarded as resulting from an IFFT operation on a frequency domain preamble. Therefore, an IFFT operation on the time domain preambles is not needed.

The received MIMO-OFDM signal is synchronized, as described above, and the signal is then sampled during times nT, where n=0, 1, ..., 1023, for example, to obtain sample values $r_i(nT)$, where i is an index of the respective receiver.

Each sampled value $r_i(nT)$ is then related to a plurality of time domain channel response values $ch_{mi}(kT)$ according to the relation:

$$r_i(nT) = \sum_{k=-22}^{22} ch_{mi}(kT)T_{n-k} + N_i(nT),$$

where m is an index of a respective transmitter that is transmitting a non-zero value at time nT, i—is an index of a respective receiver, $T_{n-k}$ is a corresponding known value, and $N_i(nT)$ is noise value for receiver i. The above-determined linear equations are selected, grouped and then solved to obtain the time domain channel response values $ch_{mi}(kT)$. Each group of linear equations produces a solution, and a final solution may be obtained from the weighted average of all of the solutions.

The needed number of samples of time domain channel response values depends on the channel delay spread. As an example, 45 samples are used for a particular environment. However, other numbers of samples may instead be used.

As an example, when two transmitters send data to two receivers, as shown in FIG. 5, $ch_{mi}(nT)$ vanishes when $|n|>22$. Transmitter transmits the known values $\{T_0, T_1, \ldots, T_{511}\}$ during the first half of the OFDM sequence interval, namely during the interval $[0, T_{ofdm}/2]$, and the transmitter Tx2 transmits the known values $\{T_{512}, T_{513}, \ldots, T_{1023}\}$ during the interval $[T_{ofdm}/2, T_{ofdm}]$. The signal received by the receiver Rx1 is thus defined by the relation:

$$r_1(nT) = \sum_{k=-22}^{22} ch_{11}(kT)T_{n-k} + N_1(nT), n = 0, 1, 2, \ldots, 511,$$

during the time interval $[0, T_{ofdm}/2]$ and $$r_1(nT) = \sum_{k=-22}^{22} ch_{21}(kT)T_{n-k} + N_1(nT), n = 512, 513, \ldots, 1023$$

during the time interval $[T_{ofdm}/2, T_{ofdm}]$. Thus, for the channel $ch_{11}(t)$, the useful data is $r_1(22T), r_1(21T), \ldots, r_1(511T)$, and for channel $ch_{21}(t)$, the useful data is $r_1(534T), r_1(535T), \ldots, r_1(1023T)$. The two channel response values may be estimated by solving the two systems of linear equation. Segmented data or selected data may be used to estimate the channel response values, and then the results may be averaged to obtain a smoothed solution.

The frequency channel response is then obtained by carrying out an FFT on the time domain channel response as described above.

The same process may be applied to the data received by the receiver Rx2 to estimate the channels used for transmission from transmitter Tx1 to receiver Rx2 and to estimate the channels used for transmission from transmitter Tx2 to receiver Rx2.

The frequency channel response vectors may be estimated solely by using the pilot symbols or by using the time domain preamble values.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of estimating distortion in the sub-carrier channels of signals received by a respective receiver from a plurality of transmitters, each of said signals including a portion that represented a plurality of known values when said signal was transmitted, said method comprising:

extracting said portion of said signal to obtain a frequency domain data vector;

multiplying each element of said frequency domain data vector by a respective element of a known vector to obtain a channel response vector, each element in said known vector being a function of a respective one of said plurality of known values, each element in said channel response vector being indicative of a distortion value;

selecting respective ones of said channel response vector to form a plurality of further channel response vectors, each of said further channel response vectors corresponding to a respective one of said plurality of transmitters, and inserting, within said each of said further channel response vectors, at least one zero value before or after each non-zero valued element therein such that said elements of said each of said further channel response vectors correspond to a transmission pattern of said corresponding one of said plurality of transmitters;

interpolating said elements of said further channel response vectors to obtain a plurality of distortion values each corresponding to a respective zero value element of said further channel response vectors, and substituting said plurality of distortion values in place of said corresponding zero value element;

performing an inverse fast Fourier transform (IFFT) on each of said further channel response vectors to obtain a plurality of time domain further channel response vectors;

substituting a zero value in place of any element of said time domain further channel response vectors that has a value indicative of signal noise; and performing a fast Fourier transform (FFT) on said time domain further channel response vectors to obtain a plurality of frequency response vectors.

2. The method of claim 1 wherein said signal comprises an Orthogonal Frequency Division Multiplexing (OFDM) signal.

3. The method of claim 1 wherein each of said plurality of transmitters transmits via at least one sub-carrier channel that is unique to said each transmitter and to said respective receiver.

4. The method of claim 1 wherein said respective receiver comprises one of a plurality of receivers and each of said plurality of transmitters transmits via at least one sub-carrier channel that is unique to said each transmitter and to a respective one of said plurality of receivers.

5. The method of claim 1 wherein said portion of said signals comprises a preamble portion, and said transmission pattern of said corresponding one of said plurality of transmitters comprises a transmission pattern of said preamble portion.

6. The method of claim 1 wherein said known values comprise sequences pseudo-noise (PN) values, each of said sequences of PN values corresponding to a respective one of said plurality of transmitters.

7. The method of claim 6 wherein each element of each of said sequences of PN values is defined by the relation:

$$C_m(i)=(-1)^{mi}\exp(j\pi m^2 i/1024),$$

where i is the index of a respective element in said sequence and has a value i=1, ..., 1024, m is an integer index value that is uniquely assigned to a respective one of said plurality of transmitters, and j=sqrt(-1).

8. The method of claim 7 wherein said value m is a prime number that is selected from the values 3, 5, 7, 11, 13, 17, ..., 1023.

9. The method of claim 1 wherein said extracting step comprises: sampling said portion of said signal to obtain a data vector, and performing a fast Fourier transform (FFT) on said data vector to obtain said frequency domain data vector.

10. The method of claim 1 wherein each element in said known vector comprises a complex conjugate of a respective one of said plurality of known values.

11. A method of estimating distortion in the sub-carrier channels of signals received by a respective receiver from a plurality of transmitters, each of said signals including a portion that represented a plurality of known values when said signal was transmitted, said method comprising:

extracting said portion of said signal to obtain a frequency domain data vector;

multiplying said frequency domain data vector by a known array to obtain a channel response vector, each element in said known array being a function of a respective one of said plurality of known values, each element in said channel response vector being indicative of a distortion value;

interpolating said elements of said channel response vector to obtain at least one distortion value corresponding to a respective zero value element of said further channel response vectors, and substituting said plurality of distortion values in place of said corresponding zero value element;

performing an inverse fast Fourier transform (IFFT) on said channel response vector to obtain a frequency domain channel response vector;

substituting a zero value in place of any element of said time domain further channel response vectors that has a value indicative of signal noise; and performing a fast Fourier transform (FFT) on said time domain further channel response vectors to obtain a plurality of frequency response vectors.

12. The method of claim 11 wherein said signal comprises an Orthogonal Frequency Division Multiplexing (OFDM) signal.

13. The method of claim 11 wherein each of said plurality of transmitters transmits via at least one sub-carrier channel that is unique to said each transmitter and to said respective receiver.

14. The method of claim 11 wherein said respective receiver comprises one of a plurality of receivers and each of said plurality of transmitters transmits via at least one sub-carrier channel that is unique to said each transmitter and to a respective one of said plurality of receivers.

15. The method of claim 11 wherein said portion of said signals comprises at least two pilot values that are inserted within said signals at known locations therein.

16. The method of claim 15 wherein said known locations comprise predetermined sub-carrier channels.

17. The method of claim 15 wherein said at least two pilot values are transmitted during an interval, and at least two further values are transmitted during a further interval, each said at least two further values being a function of a complex conjugate of a respective one of said at least two pilot values.

18. The method of claim 17 wherein a row of said array comprises said at least two pilot values, and a further row of said array comprises said at least two further values.

19. The method of claim 15 wherein said multiplying step comprises the following relation:

$$\begin{bmatrix} H_{1i}(k) \\ H_{2i}(k) \\ \vdots \end{bmatrix} = \frac{1}{|C(1)|^2 + |C(2)|^2 + \dots} \begin{bmatrix} C(1) & C(2) & \dots \\ -C(2)^* & C(1)^* & \dots \\ \vdots & \vdots & \ddots \end{bmatrix}^* \begin{bmatrix} y_i(1, k) \\ y_i(2, k)^* \\ \vdots \end{bmatrix},$$

wherein i is an index of the respective receiver, k is a respective sub-carrier channel, $H_{1i}(k)$ is an element in said channel response vector indication a channel response for a signal transmitted by transmitter 1 to receiver i over sub-carrier channel k, $H_{2i}(k)$ is an element in said channel response vector indication a channel response for a signal transmitted by transmitter 2 to receiver i via sub-carrier channel k, C(1) is a pilot value transmitted by transmitter 1, C(2) is a pilot value transmitted by transmitter 2, $y_1(1,k)$ is an element of said frequency domain data vector representing a value received by receiver i from transmitter 1 via sub-carrier channel k, and $y_2(1,k)$ is an element of said frequency domain data vector representing a value received by receiver i from transmitter 2 via sub-carrier channel k.

20. The method of claim 19 wherein said plurality of receivers comprises two receivers having indices i=1, 2, respectively, and said multiplying step comprises the following relations:

$$\begin{bmatrix} H_{11}(k) \\ H_{21}(k) \end{bmatrix} = \frac{1}{|C(1)|^2 + |C(2)|^2} \begin{bmatrix} C(1) & C(2) \\ -C(2)^* & C(1)^* \end{bmatrix}^* \begin{bmatrix} y_1(1,k) \\ y_1(2,k)^* \end{bmatrix}$$

$$\begin{bmatrix} H_{12}(k) \\ H_{22}(k) \end{bmatrix} = \frac{1}{|C(1)|^2 + |C(2)|^2} \begin{bmatrix} C(1) & C(2) \\ -C(2)^* & C(1)^* \end{bmatrix}^* \begin{bmatrix} y_2(1,k) \\ y_2(2,k)^* \end{bmatrix}.$$

21. The method of claim 11 wherein said extracting step comprises: sampling said portion of said signal to obtain a data vector, and performing a fast Fourier transform (FFT) on said data vector to obtain said frequency domain data vector.

22. A method of estimating distortion in the sub-carrier channels of signals received by a respective receiver from a plurality of transmitters, each of said signals including a portion that represented a plurality of known values when said signal was transmitted, said method comprising:

extracting said portion of said signal during at least portion of a plurality of times nT, to obtain a plurality of sample values $r_i(nT)$, wherein i is an index of said respective receiver;

defining each of said plurality of sample values $r_i(nT)$ as a function of a plurality of time domain channel response values $ch_{mi}(kT)$ according to the relation:

$$r_1(nT) = \sum_{k=22}^{22} ch_{mi}(kT)T_{n-k} + N_i(nT),$$

wherein m is an index of a respective one of said plurality of transmitters that is transmitting a non-zero value at time nT, $T_{n-k}$ is a corresponding one of said plurality of known values, and $N_i(nT)$ is noise value for receiver i, thereby obtaining a plurality of equations;

solving said plurality of equations to obtain a plurality of solutions; and averaging said plurality of solutions to obtain said plurality of time domain channel response values $ch_{mi}(kT)$.

23. The method of claim 22 wherein said signal comprises an Orthogonal Frequency Division Multiplexing (OFDM) signal.

24. The method of claim 22 wherein each of said plurality of transmitters transmits via at least one sub-carrier channel that is unique to said each transmitter and to said respective receiver.

25. The method of claim 22 wherein said respective receiver i comprises one of a plurality of receivers and each of said plurality of transmitters transmits via at least one sub-carrier channel that is unique to said each transmitter and to a respective one of said plurality of receivers.

26. The method of claim 22 wherein said portion of said signals comprises a preamble portion.

27. The method of claim 22 wherein said plurality of transmitters comprises two transmitters, one of said two transmitters having m=1 and transmitting values $\{T_0, T_1, \ldots, T_{511}\}$ during a first part half of an OFDM interval and transmitting zero values during a remainder of said OFDM interval, another of said two transmitters having m=2 and transmitting values $\{T_{512}, T_{513}, \ldots, T_{1023}\}$ during a second part of said OFDM interval and transmitting zero values during a further remainder of said OFDM interval, and for receiver i=1, said plurality of sample values $r_i(nT)$ is defined according to the relations:

$$r_1(nT) = \sum_{k=22}^{22} ch_{11}(kT)T_{n-k} + N_1(nT), \text{ where } n = 0, 1, 2, \ldots, 511, \text{ and}$$

$$r_1(nT) = \sum_{k=-22}^{22} ch_{21}(kT)T_{n-k} + N_1(nT), \text{ where } n = 512, 513, \ldots, 1023.$$

28. The method of claim 22 further comprising the step of performing a fast Fourier transform (FFT) on said plurality of time domain channel response values $ch_{mi}(kT)$ to obtain a plurality of frequency domain channel response values.

29. An apparatus for estimating distortion in the sub-carrier channels of signals received by a respective receiver from a plurality of transmitters, each of said signals including a portion that represented a plurality of known values when said signal was transmitted, said apparatus being configured to:

extract said portion of said signal to obtain a frequency domain data vector;

multiply each element of said frequency domain data vector by a respective element of a known vector to obtain a channel response vector, each element in said known vector being a function of a respective one of said plurality of known values, each element in said channel response vector being indicative of a distortion value;

select respective ones of said channel response vector to form a plurality of further channel response vectors, each of said further channel response vectors corresponding to a respective one of said plurality of transmitters, and inserting, within said each of said further channel response vectors, at least one zero value before or after each non-zero valued element therein such that said elements of said each of said further channel response vectors correspond to a transmission pattern of said corresponding one of said plurality of transmitters;

interpolate said elements of said further channel response vectors to obtain a plurality of distortion values each corresponding to a respective zero value element of said further channel response vectors, and substitute said plurality of distortion values in place of said corresponding zero value element;

perform an inverse fast Fourier transform (IFFT) on each of said further channel response vectors to obtain a plurality of time domain further channel response vectors substitute a zero value in place of any element of said time domain further channel response vectors that has a value indicative of signal noise; and perform a fast Fourier transform (FFT) on said time domain further channel response vectors to obtain a plurality of frequency response vectors.

30. The apparatus of claim 29 wherein said signal comprises an Orthogonal Frequency Division Multiplexing (OFDM) signal.

31. The apparatus of claim 29 wherein each of said plurality of transmitters transmits via at least one sub-carrier channel that is unique to said each transmitter and to said respective receiver.

32. The apparatus of claim 29 wherein said respective receiver comprises one of a plurality of receivers and each of said plurality of transmitters transmits via at least one sub-carrier channel that is unique to said each transmitter and to a respective one of said plurality of receivers.

33. The apparatus of claim 29 wherein said portion of said signals comprises a preamble portion, and said transmission pattern of said corresponding one of said plurality of transmitters comprises a transmission pattern of said preamble portion.

34. The apparatus of claim 29 wherein said known values comprise sequences of psuedo-noise (PN) values, each of said sequences of PN values corresponding to a respective one of said plurality of transmitters.

35. The apparatus of claim 34 wherein each element of each of said sequences of PN values is defined by the relation:

$$C_m(i) = (-1)^{mi} \exp(j\pi m^2 i / 1024),$$

where i is the index of a respective element in said sequence and has a value i=1, ..., 1024, m is an integer index value that is uniquely assigned to a respective one of said plurality of base stations, and j=sqrt(−1).

36. The apparatus of claim 35 wherein said value m is a prime number that is selected from the values 3, 5, 7, 11, 13, 17, ..., 1023.

37. The apparatus of claim 29 further configured to sample said portion of said signal to obtain a data vector, and means for perform a fast Fourier transform (FFT) on said data vector to obtain said frequency domain data vector.

38. The apparatus of claim 29 wherein each element in said known vector comprises a complex conjugate of a respective one of said plurality of known values.

39. An apparatus for estimating distortion in the sub-carrier channels of signals received by a respective receiver from a plurality of transmitters, each of said signals including a portion that represented a plurality of known values when said signal was transmitted, said apparatus being configured to:

extract said portion of said signal to obtain a frequency domain data vector;

multiply said frequency domain data vector by a known array to obtain a channel response vector, each element in said known array being a function of a respective one of said plurality of known values, each element in said channel response vector being indicative of a distortion value;

interpolate said elements of said channel response vector to obtain at least one distortion value corresponding to a respective zero value element of said further channel response vectors, and substitute said plurality of distortion values in place of said corresponding zero value element;

perform an inverse fast Fourier transform (IFFT) on said channel response vector to obtain a frequency domain channel response vector;

substitute a zero value in place of any element of said time domain further channel response vectors that has a value indicative of signal noise; and perform an FFT on said time domain further channel response vectors to obtain a plurality of frequency response vectors.

40. The apparatus of claim 39 wherein said signal comprises an Orthogonal Frequency Division Multiplexing (OFDM) signal.

41. The apparatus of claim 39 wherein each of said plurality of transmitters transmits via at least one sub-carrier channel that is unique to said each transmitter and to said respective receiver.

42. The apparatus of claim 39 wherein said respective receiver comprises one of a plurality of receivers and each of said plurality of transmitters transmits via at least one sub-carrier channel that is unique to said each transmitter and to a respective one of said plurality of receivers.

43. The apparatus of claim 39 wherein said portion of said signals comprises at least two pilot values that are inserted within said signals at known locations therein.

44. The apparatus of claim 43 wherein said known locations comprise predetermined sub-carrier channels.

45. The apparatus of claim 43 wherein said at least two pilot values are transmitted during an interval, and at least two further values are transmitted during a further interval, each said at least two further values being a function of a complex conjugate of a respective one of said at least two pilot values.

46. The apparatus of claim 45 wherein a row of said array comprises said at least two pilot values, and a further row of said array comprises said at least two further values.

47. The apparatus of claim 43 wherein said multiplying means multiplies according to the following relation:

$$\begin{bmatrix} H_{1i}(k) \\ H_{2i}(k) \\ \vdots \end{bmatrix} = \frac{1}{|C(1)|^2 + |C(2)|^2 + \ldots} \begin{bmatrix} C(1) & C(2) & \cdots \\ -C(2)^* & C(1)^* & \cdots \\ \vdots & \vdots & \ddots \end{bmatrix}^* \begin{bmatrix} y_i(1,k) \\ y_i(2,k)^* \\ \vdots \end{bmatrix},$$

wherein i is an index of the respective receiver, k is a respective sub-carrier channel, $H_{1i}(k)$ is an element in said channel response vector indication a channel response for a signal transmitted by transmitter 1 to receiver i over sub-carrier channel k, $H_{2i}(k)$ is an element in said channel response vector indication a channel response for a signal transmitted by transmitter 2 to receiver i via sub-carrier channel k, C(1) is a pilot value transmitted by transmitter 1, C(2) is a pilot value transmitted by transmitter 2, $y_1(1,k)$ is an element of said frequency domain data vector representing a value received by receiver i from transmitter 1 via sub-carrier channel k, and $Y_2(1,k)$ is an element of said frequency domain data vector representing a value received by receiver i from transmitter 2 via sub-carrier channel k.

48. The apparatus of claim 47 wherein said plurality of receivers comprises two receivers having indices i=1, 2, respectively, and said multiplying means multiplies according to the following relations:

$$\begin{bmatrix} H_{11}(k) \\ H_{21}(k) \end{bmatrix} = \frac{1}{|C(1)|^2 + |C(2)|^2} \begin{bmatrix} C(1) & C(2) \\ -C(2)^* & C(1)^* \end{bmatrix}^* \begin{bmatrix} y_1(1,k) \\ y_1(2,k)^* \end{bmatrix}$$

$$\begin{bmatrix} H_{12}(k) \\ H_{22}(k) \end{bmatrix} = \frac{1}{|C(1)|^2 + |C(2)|^2} \begin{bmatrix} C(1) & C(2) \\ -C(2)^* & C(1)^* \end{bmatrix}^* \begin{bmatrix} y_2(1,k) \\ y_2(2,k)^* \end{bmatrix}.$$

49. The apparatus of claim 39 further configured to: sample said portion of said signal to obtain a data vector, and perform a fast Fourier transform (FFT) on said data vector to obtain said frequency domain data vector.

50. An apparatus for estimating distortion in the sub-carrier channels of signals received by a respective receiver from a plurality of transmitters, each of said signals including a portion that represented a plurality of known values when said signal was transmitted, said apparatus being configured to:

extract said portion of said signal during at least portion of a plurality of times nT, wherein n=0, 1, ..., 1023, to obtain a plurality of sample values $r_i(nT)$, wherein i is an index of said respective receiver;

define each of said plurality of sample values $r_i(nT)$ as a function of a plurality of time domain channel response values $ch_{mi}(kT)$ according to the relation:

$$r_1(nT) = \sum_{k=22}^{22} ch_{mi}(kT)T_{n-k} + N_i(nT)$$

wherein m is an index of a respective one of said plurality of transmitters that is transmitting a non-zero value at time nT, $T_{n-k}$ is a corresponding one of said plurality of known values, and $N_i(nT)$ is noise value for receiver i, thereby obtaining a plurality of equations; and solve said plurality of equations to obtain a plurality of solutions; and average said plurality of solutions to obtain said plurality of time domain channel response values $ch_{mi}(kT)$.

51. The apparatus of claim 50 wherein said signal comprises an Orthogonal Frequency Division Multiplexing (OFDM) signal.

52. The apparatus of claim 50 wherein each of said plurality of transmitters transmits via at least one sub-carrier channel that is unique to said each transmitter and to said respective receiver.

53. The apparatus of claim 50 wherein said respective receiver i comprises one of a plurality of receivers and each of said plurality of transmitters transmits via at least one sub-carrier channel that is unique to said each transmitter and to a respective one of said plurality of receivers.

54. The apparatus of claim 50 wherein said portion of said signals comprises a preamble portion.

55. The apparatus of claim 50 wherein said plurality of transmitters comprises two transmitters, one of said two transmitters having m=1 and transmitting values $\{T_0, T_1, \ldots, T_{511}\}$ during a first part of an OFDM interval and transmitting zero values during a remainder of said OFDM interval, another of said two transmitters having m=2 and transmitting values $\{T_{512}, T_{513}, \ldots, T_{1023}\}$ during a second part of said OFDM interval and transmitting zero values during a further remainder of said OFDM interval, and for receiver i=1, said plurality of sample values $r_i(nT)$ is defined according to the relations:

$$r_1(nT) = \sum_{k=22}^{22} ch_{11}(kT)T_{n-k} + N_1(nT), \text{ where } n = 0, 1, 2, \ldots, 511, \text{ and}$$

$$r_1(nT) = \sum_{k=-22}^{22} ch_{21}(kT)T_{n-k} + N_1(nT), \text{ where } n = 512, 513, \ldots, 1023.$$

56. The apparatus of claim 50 further comprising means for performing a fast Fourier transform (FFT) on said plurality of time domain channel response values $ch_{mi}(kT)$ to obtain a plurality of frequency domain channel response values.

57. An apparatus for estimating distortion in the sub-carrier channels of signals received by a respective receiver from a plurality of transmitters, each of said signals including a portion that represented a plurality of known values when said signal was transmitted, said apparatus comprising:

means for extracting said portion of said signal to obtain a frequency domain data vector;

means for multiply each element of said frequency domain data vector by a respective element of a known vector to obtain a channel response vector, each element in said known vector being a function of a respective one of said plurality of known values, each element in said channel response vector being indicative of a distortion value;

means for selecting respective ones of said channel response vector to form a plurality of further channel response vectors, each of said further channel response vectors corresponding to a respective one of said plurality of transmitters, and inserting, within said each of said further channel response vectors, at least one zero value before or after each non-zero valued element therein such that said elements of said each of said further channel response vectors correspond to a transmission pattern of said corresponding one of said plurality of transmitters;

means for interpolating said elements of said further channel response vectors to obtain a plurality of distortion values each corresponding to a respective zero value element of said further channel response vectors, and for substituting said plurality of distortion values in place of said corresponding zero value element;

means for performing an inverse fast Fourier transform (IFFT) on each of said further channel response vectors to obtain a plurality of time domain further channel response vectors;

means for substituting a zero value in place of any element of said time domain further channel response vectors that has a value indicative of signal noise; and means for performing an fast Fourier transform (FFT) on said time domain further channel response vectors to obtain a plurality of frequency response vectors.

58. An apparatus for estimating distortion in the sub-carrier channels of signals received by a respective receiver from a plurality of transmitters, each of said signals including a portion that represented a plurality of known values when said signal was transmitted, said apparatus comprising:

means for sampling said portion of said signal to obtain a frequency domain data vector;

means for multiplying said frequency domain data vector by a known array to obtain a channel response vector, each element in said known array being a function of a respective one of said plurality of known values, each element in said channel response vector being indicative of a distortion value;

means for interpolating said elements of said channel response vector to obtain a least one distortion value corresponding to a respective zero value element of said further channel response vectors, and for substituting said plurality of distortion values in place of said corresponding zero value element;

means for performing an inverse fast Fourier transform (IFFT) on said channel response vector to obtain a frequency domain channel response vector;

means for substituting a zero value in place of any element of said time domain further channel response vectors that has a value indicative of signal noise; and means for performing an fast Fourier transform (FFT) on said time domain further channel response vectors to obtain a plurality of frequency response vectors.

59. An apparatus for estimating distortion in the sub-carrier channels of signals received by a respective receiver from a plurality of transmitters, each of said signals including a portion that represented a plurality of known values when said signal was transmitted, said apparatus comprising:

means for sampling said portion of said signal during at least portion of plurality of times nT, wherein n=0, 1, ..., 1023, to obtain a plurality of sample values $r_i(nT)$, wherein i is an index of said respective receiver;

means for defining each of said plurality of sample values $r_i(nT)$ as a function of a plurality of time domain channel response values $ch_{mi}(kT)$ according to the relation:

$$r_i(nT) = \sum_{k=22}^{22} ch_{mi}(kT)T_{n-k} + N_i(nT),$$

wherein m is an index of a respective one of said plurality of transmitters that is transmitting a non-zero value at time nT, $T_{n-k}$ is a corresponding one of said plurality of known values, and $N_i(nT)$ is noise value for receiver i, thereby obtaining a plurality of equations;

means for solving said plurality of equations to obtain a plurality of solutions; and means for averaging said plurality of solutions to obtain said plurality of time domain channel response values $ch_{mi}(kT)$.

* * * * *